United States Patent [19]
Saar

[11] Patent Number: 5,799,213
[45] Date of Patent: Aug. 25, 1998

[54] BACKGROUND UNFURLING APPARATUS AND METHOD

[76] Inventor: Raymond K. Saar, 23859 Tocoloma Rd., Apple Valley, Calif. 92307

[21] Appl. No.: 872,526

[22] Filed: Jun. 11, 1997

[51] Int. Cl.⁶ .................................................. G03B 15/00
[52] U.S. Cl. ........................................................ 396/3
[58] Field of Search ............................................ 396/3

[56] References Cited

U.S. PATENT DOCUMENTS

| | | |
|---|---|---|
| 624,111 | 5/1899 | Snow ........................................ 396/3 |
| 3,128,688 | 4/1964 | Coda ........................................ 396/3 |
| 5,389,993 | 2/1995 | Adolphi et al. ........................... 396/3 |

*Primary Examiner*—David M. Gray
*Attorney, Agent, or Firm*—Gene Scott-Patent Law & Venture Group

[57] ABSTRACT

A background support system for use in a photographic studio includes a single-roller assembly upon which a number of backgrounds are mounted and from which any specific background is rapidly selected for display.

16 Claims, 7 Drawing Sheets

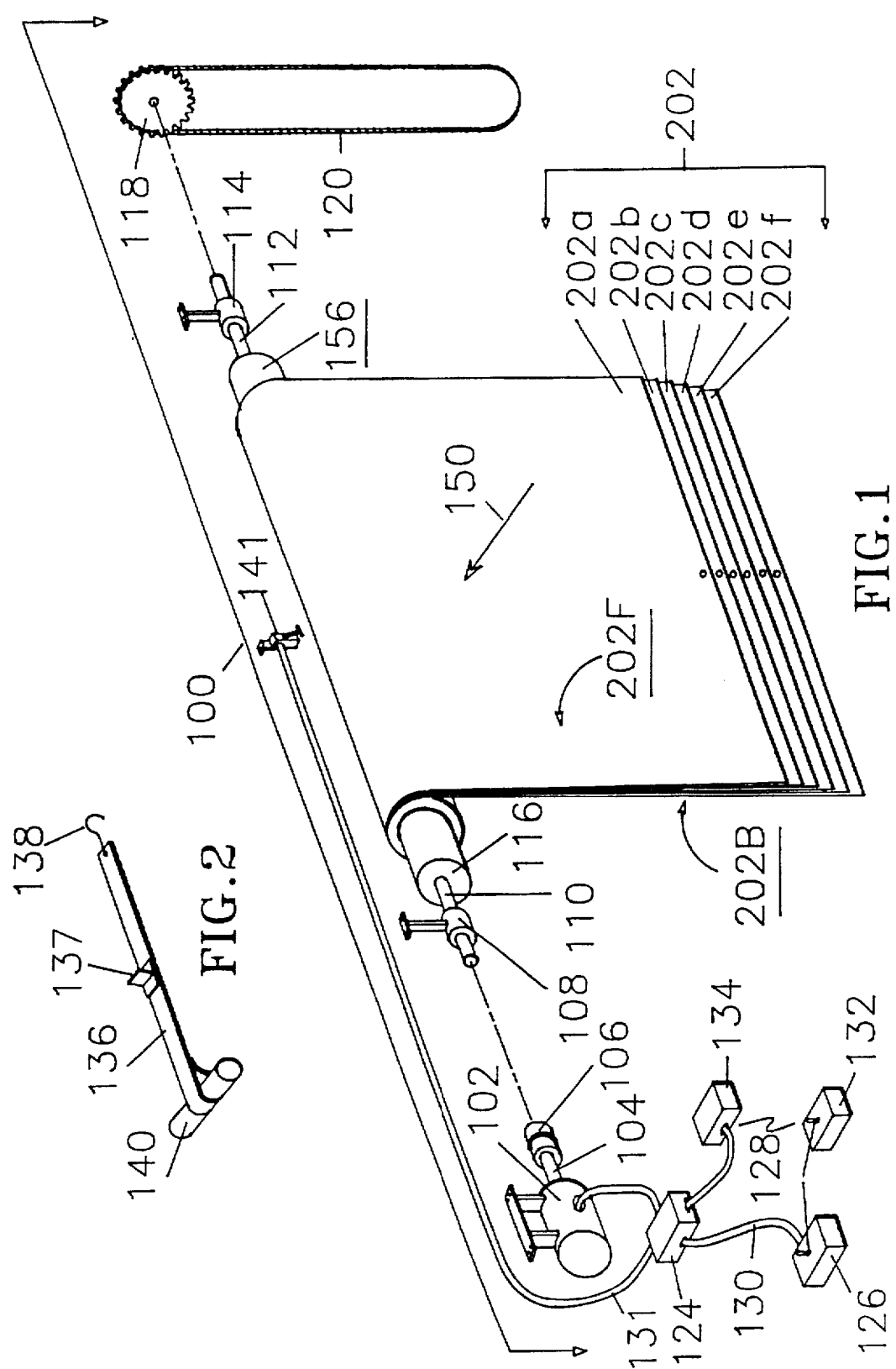

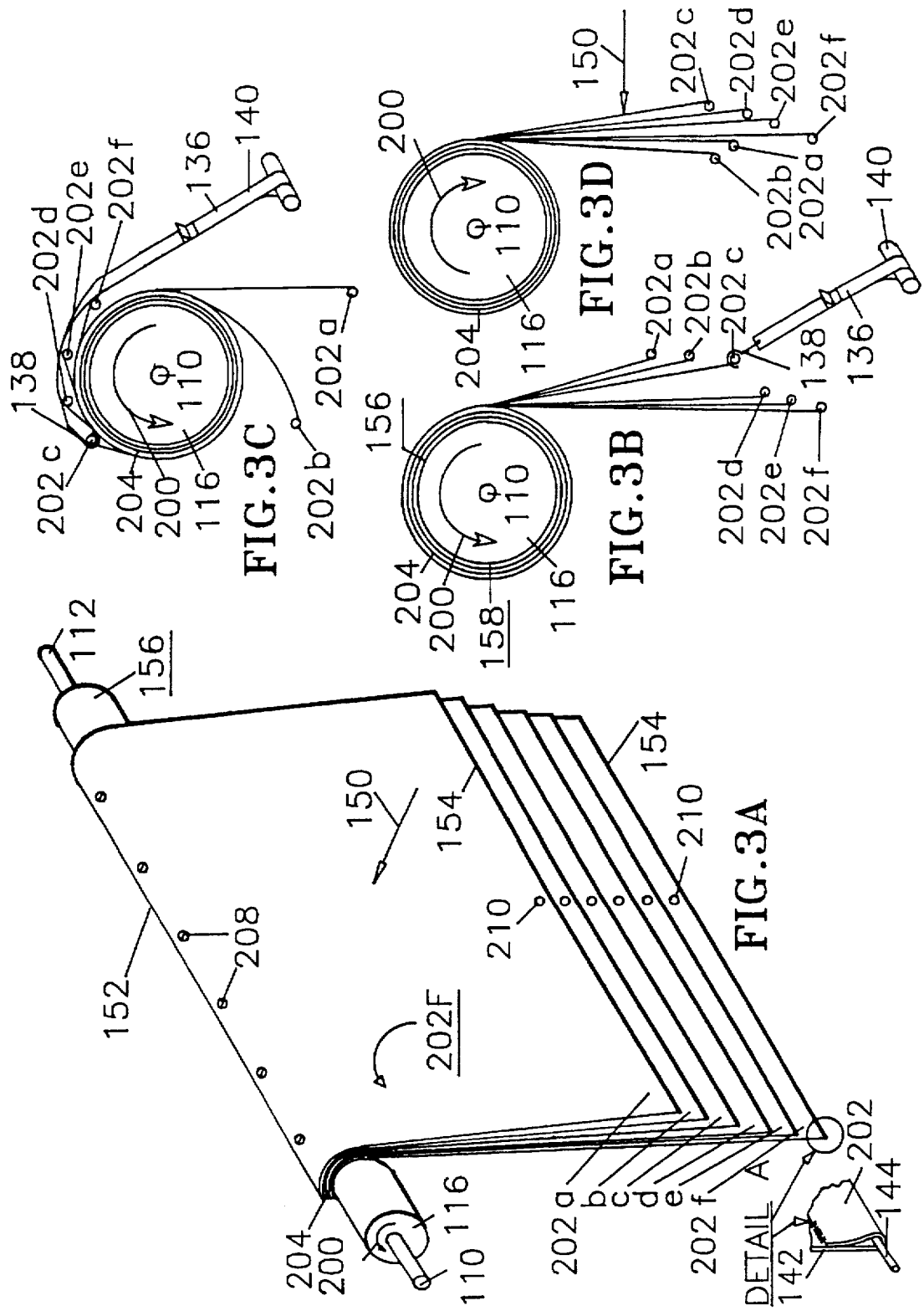

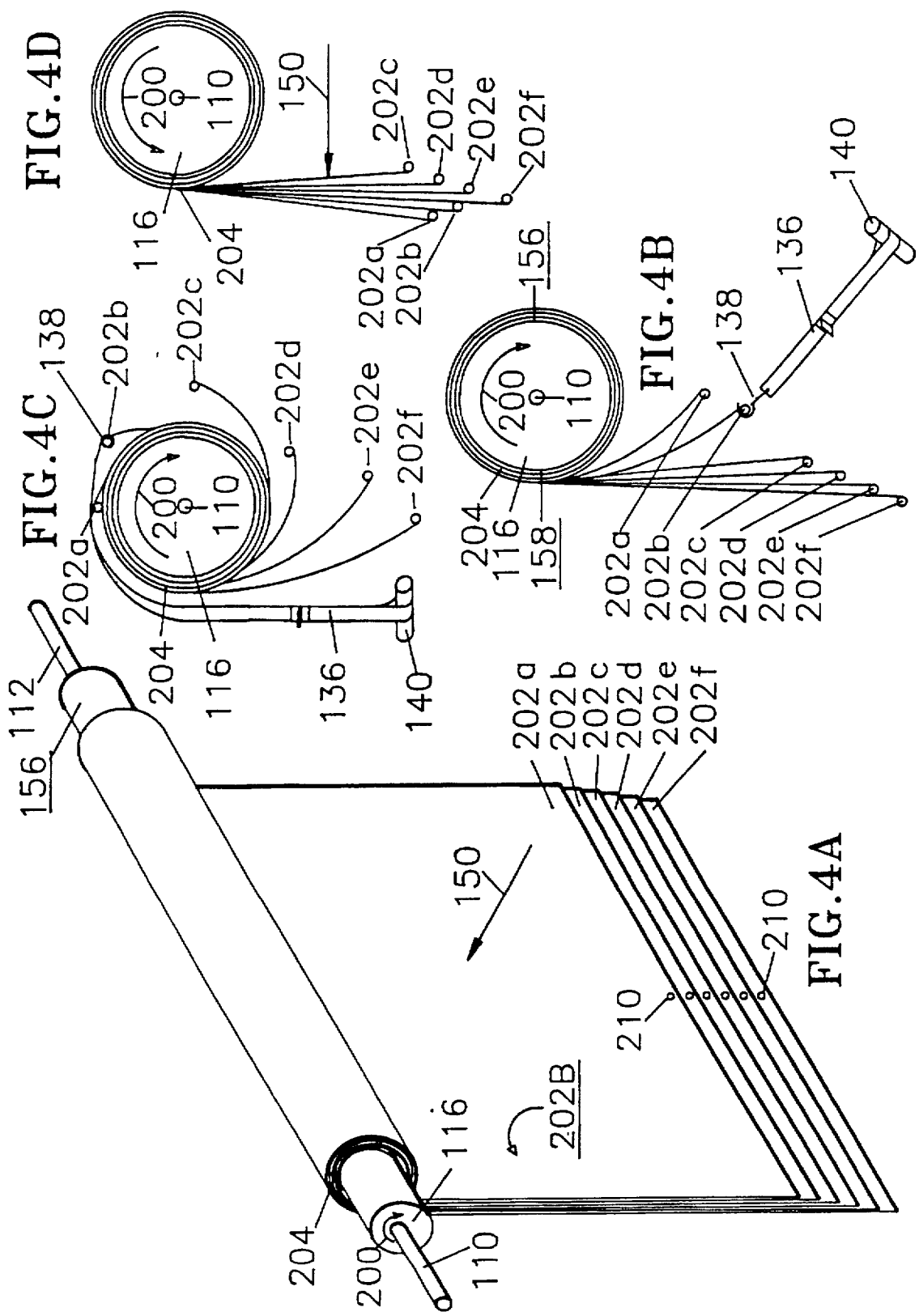

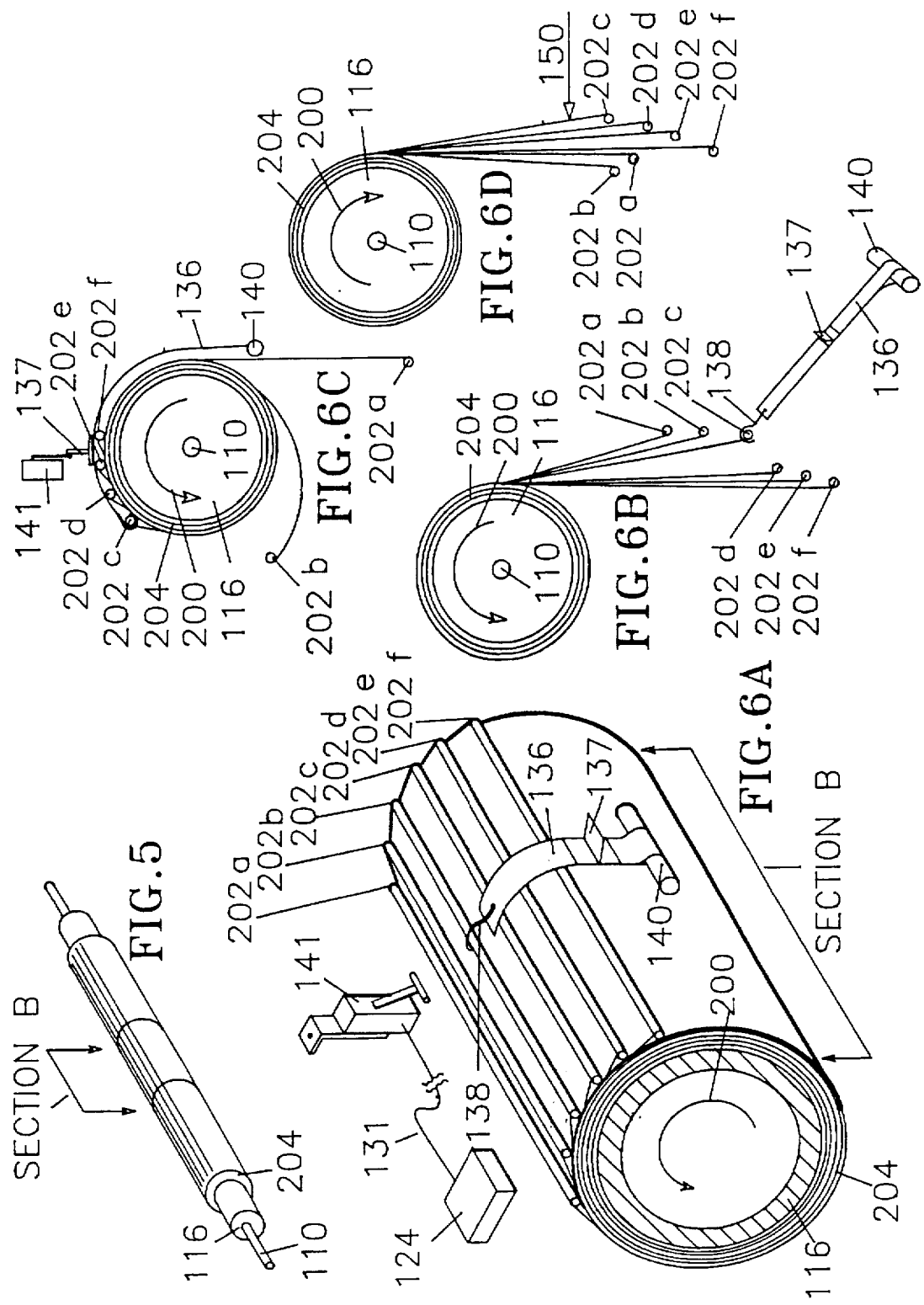

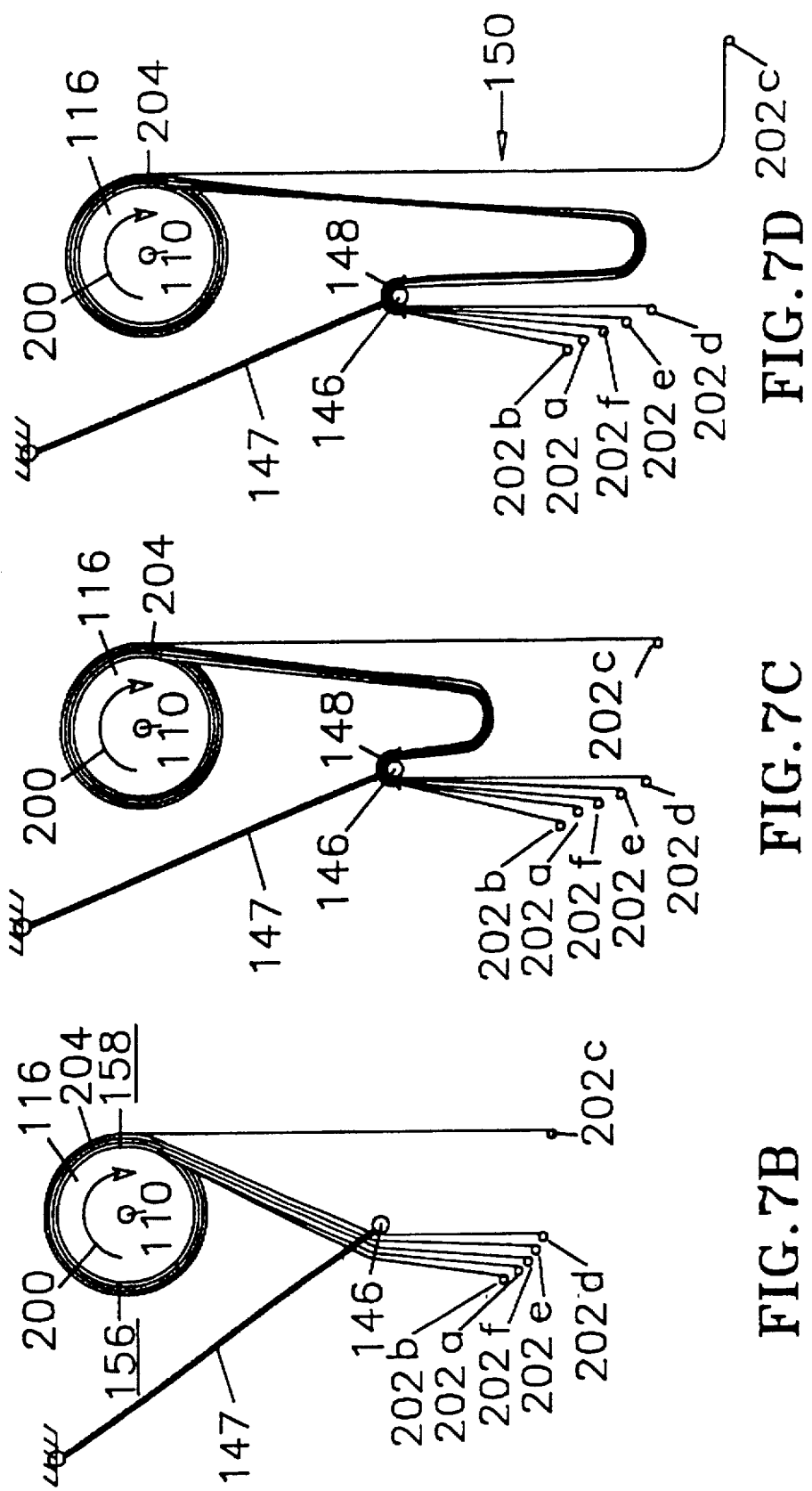

BACKGROUND UNFURLING APPARATUS AND METHOD

BACKGROUND OF THE INVENTION

1. Field of the Invention

This invention relates to a photographic background apparatus for storing and displaying a number of different backgrounds mounted upon a single roller assembly and to a method for its use.

2. Description of Related Art

Canvas and paper backgrounds are widely used in photography and in theatrical productions. Generally, a background which depicts a particular scene or provides a particular color is wound on a single roller suspended from a ceiling or other elevated structure. When a particular background is to be used, the background is unrolled and hangs therefrom to give the desired effect. As there are different occasions for having photographs taken, and as peoples' tastes vary widely, portrait studios are required to provide a variety of backgrounds. To accommodate multiple backgrounds, multiple roller assemblies must be provided. Assuming the need exists for twelve different backgrounds, it becomes quite expensive to provide twelve rollers, twelve actuating motors, and twelve electrical control systems. Moreover, since the shafts are typically mounted horizontally adjacently to one another, having twelve such roller assemblies mounted on the ceiling consumes more front-to-back space than many smaller studios can afford. Also, the difference in distance between the background nearest to the camera and the one farthest away can vary as much as 2 to 3 meters. Each time a different background is chosen, the photographer must move his background lighting closer or farther away. In addition, he has to refocus his camera to compensate for the changing camera-to-background distances. As distances are important in portrait photography, these non-uniform distances between the camera and the background introduce unwanted photographic situations. In an effort to solve these problems, some have tried connecting a series of backgrounds end to end to form a continuous web. As indicated in U.S. Pat. Nos. 3,128,688 and 5,389,993, such webs are wound between two shafts to form a scroll. When a new background is required, the web is scrolled from one shaft to the other until the desired background is located and maneuvered into position. Continuing with the assumption that twelve different backgrounds are desired, and each background is at least 2¾ meters long, the continuous web will approach 33 meters in length. This web length can pose some rather significant operational problems. Firstly, scrolling a 33-meter web must be done slowly to prevent damaging it. Secondly, as backgrounds have to be attached one to the other, extreme care must be taken to insure that the center line of each background is held closely to 90° degrees with respect to the axis of rotation of each of the two rollers to preclude troublesome and even damaging telescoping (lateral displacement) of the edges as they are scrolled back and forth between the shafts. Lastly, the time required to scroll through 33 meters at a slow rate can introduce undue delays during a photographic session. In the case of the system described in U.S. Pat. No. 3,128,688, proper positioning of a given background requires an operator to maneuver it into the correct position. This process not only consumes additional time, but also introduces the possibility of human error as the operator attempts to position a background correctly.

U.S. Pat. No. 5,389,993 has addressed and provided solutions to some of the aforementioned problems of U.S. Pat. No. 3,128,688. By adding a stabilizing roller weight disposed on a web positioned between the shafts, many of the scrolling problems are minimized. By adding a sophisticated optical encoder detection system, a central processing unit (CPU), data processing, and data storage provision, U.S. Pat. No. 5,389,993 is capable of knowing exactly the given location of any background at any time, thus allowing for automatic positioning of any background. While such systems perform adequately under optimal conditions, their initial setup and continued satisfactory operation may require the services of someone with skills different from that of a photographer. For example, the system is not supplied with the web of backgrounds preassembled as the photographer has to choose the backgrounds he feels are appropriate to serve his clientele. Following his selection of backgrounds, he must: (a) attach them such that they track from one shaft to the other without excessive telescoping; (b) position the twelve spatially significant identifying tags; (c) calibrate the CPU correctly; and (d) hope that an overnight power failure won't erase the CPU memory. Of all these tasks, the most daunting is assembling the backgrounds in a manner that precludes excessive telescoping of the web. Should it be required, at any point in time to add a new background or to replace one that has become damaged, the zero position of the CPU will shift with respect to the patches, thus requiring its recalibration. In addition, considerable problems inherent in two-roller web scrolling systems still remain. Firstly, extreme care must be taken to align each background carefully to prevent telescoping of the web as it is scrolled between the two rollers; and secondly, the time required to scroll through 30-plus meters of a web at a slow rate can be disruptive to the photographic process.

The prior art teaches the use of roll mounted and unfurled backdrops. However, the prior art does not teach that backdrops may be rolled in parallel onto a single roll and positioned on that roll as necessary to unroll a selected backdrop as required. The present invention fulfills these needs and provides further related advantages as described in the following summary.

SUMMARY OF THE INVENTION

The present invention teaches certain benefits in construction and use which give rise to the objectives described below.

Accordingly, several objects and advantages of the present invention are:

(a) to provide a background support system utilizing a single roller assembly upon which a plurality of backgrounds can be stored and selectively displayed;

(b) to provide a system which obviates the need for multiple support rollers with their attendant consumption of excessive front-to-back studio space and unnecessary high cost;

(c) to provide a system which minimizes the telescoping problems associated with the two-shaft continuous web scrolling configuration;

(d) to provide a system with a minimum number of components, thus assuring increased reliability with its attendant reduction in maintenance costs;

(e) to provide a system which allows for rapid acquisition and display of any desired background from its stored position;

(f) to provide a system which repeatedly locates the plane of the displayed background to within plus or minus a few centimeters camera-to-background distance, eliminating the need to reposition background lighting equipment or to refocus the camera when backgrounds are changed; and (g) to provide a system which eliminates the need for optical-electronics background positioning equipment with its attendant calibration requirements and need for skills not normally possessed by the average photographer.

Accordingly, the reader can see that an apparatus capable of accommodating a large number of varied backgrounds and one which is provided with a simple technique for the selection and display of any given background, should fulfill a critical need in the area of studio portrait photography. Pursuant to this need, a background support system has been developed which possesses the following characteristics:

it permits the storage and display of as many as 24 different backgrounds using a single roller;

it provides a rapid and simplistic procedure for the extraction of any desired background from its stored position and its presentation to the camera for use;

it allows any background chosen to lie in a vertical plane which is repeatable, background to background, within plus or minus a few centimeters, thus stabilizing the camera to background distance;

it permits the photographer to leave the position of his background lighting equipment unchanged when switching between backgrounds because of the stabilized camera to background distance;

it permits the photographer to leave the focus setting of his camera unchanged when switching between backgrounds, again, because of the stabilized camera to background distance;

it precludes the need for excessive consumption of front to back studio space currently required by single roller, single background configurations when multiple backgrounds are required.

Although the description above contains many specifics, these should not be construed as limiting the scope of the invention, but merely as illustrations of some of the presently preferred embodiments of this invention, for example:

various combinations of optical, magnetic, electrical, electronic, and mechanical sensing and positioning elements can be employed to further automate the process of selecting a desired background from its stored position and presenting it for view by the camera;

actually, the permutations and combinations of these various sensing and positioning elements could run into hundreds of different configurations;

various techniques for attaching the backgrounds to the roller could be employed. These could include attaching each background separately to the roller using tape, glue, mechanical clips, magnetic clips, or providing a longitudinal slot in the roller into which the backgrounds could be inserted and locked into place;

the method of affixing the lanyard (either manual or semi-automatic) to the background could employ something other than a simple hook. i.e., a spring-loaded clip, an overcenter locking device, a magnetic clasp, a quick release mechanical interconnection of any number of configurations, etc.

Still further objects and advantages will become apparent from a consideration of the ensuing descriptions and drawings.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is a schematic of perspective view of the instant inventive background apparatus, showing the interrelationship of its principal electrical and mechanical components;

FIG. 2 is a schematic of a perspective view of a lanyard;

FIG. 3A is a schematic of a perspective view of the apparatus depicting an initial counterclockwise rotation of its roller; Detail A shows a portion of one end of a proximal end of one of the sheets;

FIG. 3B is a schematic of an end view of the roller and background stack depicting selection of a specific background sheet using the lanyard;

FIG. 3C is a schematic of an end view of the roller and background stack depicting the actual moment of separation of unwanted backgrounds from the assembled stack of backgrounds;

FIG. 3D is a schematic of an end view of the roller/background stack showing the final deployment of backgrounds and presentation of the desired background to the camera;

FIG. 4A is a schematic of a perspective view of the apparatus depicting an initial clockwise rotation of the roller;

FIG. 4B is an end view of the roller and background stack depicting selection of a specific background using the lanyard;

FIG. 4C is a schematic of an end view of the roller and background stack depicting the actual moment of separation of the specific background from the assembled stack of backgrounds;

FIG. 4D is a schematic of an end view of the roller and background stack showing the final deployment of backgrounds and presentation of the desired background to the camera;

FIG. 5 is a schematic of a perspective view of the roller and background stack identifying Section B;

FIG. 6A is a schematic of an enlarged, perspective view of Section B in FIG. 5, depicting the use of the lanyard with an initial counterclockwise rotation of the roller;

FIG. 6B is a schematic of a schematic of an end view of the roller and background stack depicting selection of a specific background using the lanyard;

FIG. 6C is a schematic of a schematic of an end view of the roller and background stack depicting the actual moment of separation of unwanted backgrounds from the assembled stack of backgrounds;

FIG. 6D is a schematic of a schematic of an end view of the roller and background stack showing the final deployment of background s and presentation of the desired background to the camera;

FIG. 7B is a schematic of an end view of the roller/background stack depicting use of the storage rack to separate the selected background sheet from the unwanted background sheets.

FIG. 7C is a schematic of an end view of the roller/background stack depicting use of the spring clamps to secure unwanted background sheets to the storage rack.

FIG. 7D is a schematic of an end view of the roller/background stack showing the final storage of unwanted background sheets and presentation of the extended background sheet to the camera.

DETAILED DESCRIPTION OF THE INVENTION

Figure 7A:
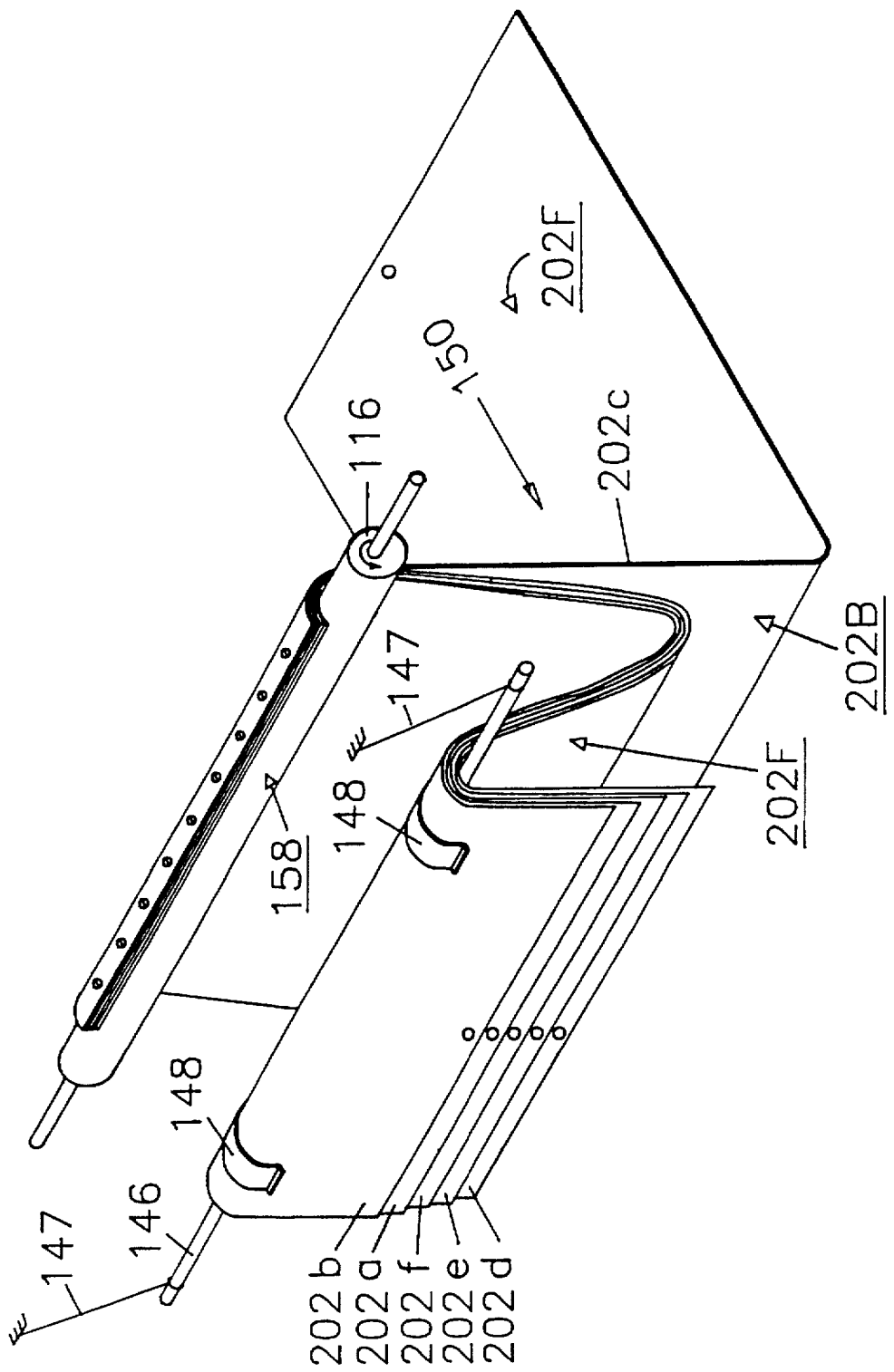
FIG. 7A is a schematic of a schematic of a perspective view of the exten ded background sheet storage apparatus.

The apparatus of the present invention comprises a plurality of flexible background sheets 202 of a woven or non-woven material such as cloth or paper, each of the sheets 202 having an outwardly facing surface 201, and an opposing inwardly facing surface 203, the surfaces providing at least two different visual effects and preferably provide a different visual effect on each surface 201 and 203. Such visual effects may be caused by coloring, patterning or other related processes. The sheets 202 are joined at a distal end 152 of each of the sheets 202 to a horizontally disposed roller 116, and coiled around the roller 116 to form a series of overlapping wraps so that proximal ends 154 of the sheets are generally aligned and extended downwardly across a front face 156 of the roller 116. Any one of the sheets 202 may be selected for extending from the roller 116 in a position for viewing as a backdrop on stage or in a studio. In this case, all of the sheets 202a and 202b lying over the selected one of the sheets, as for example sheet 202c in FIG. 3B, are capable of being uncoiled by one of the series of overlapping wraps to a position exposing the selected one of the sheets 202c so that as the roller 116 is rotated to extend the sheets 202 downwardly, the outwardly facing surface 202a of the selected one of the sheets 202c is visible from a viewpoint opposing the front face 156 of the roller 116. The proximal ends 154 of the sheets 202 are preferably spatially separated, as shown in FIG. 3A, so that a portion of each of the sheets 202 is visible from the viewpoint or camera position 150 opposing the front face 156 of the roller 116. In this case, the selection of a desired one of the sheets 202c may be more easily accomplished. The roller may be manually manipulated and the uncoiling of the unwanted sheets 202a and 202b in FIG. 3B, may also be accomplished by hand. However, it has been discovered that if the proximal ends 154 of the sheets 202 are each provided with an engagement means 210 such as the grommet shown in FIG. 3A, and if a means for weighting 140 such as lanyard weight 140, is made engagable with any one of the engagement means 210 and preferably engaged with the engagement means 210 of the selected one of the sheets 202c, it is able to urge the proximal end 154 thereof against the series of overlapping wraps and thereby facilitate the unwrapping of the sheets 202a and 202b lying over sheet 202c since they are able to fall to the backside of the roller 116 when the roller is specifically positioned to enable this to occur while the weighting means 140 holds the selected one of the sheets 202c from falling to the back side of the roller 116. The roller 116 may alternately be driven by a bi-directional drive means 102 such as a gearmotor, engaged with the roller 116 for controlled rotation. Further, a bi-directional drive means control means 124, such as a motor control unit, having forward and reverse rotation selection means (not shown) for first rotating the roller 116 in a direction for unwrapping the sheets 202a and 202b and thereafter, for rotating the roller 116 in a direction for extending the selected one of the sheets 202c downwardly for viewing, may be employed to advantage. The bi-directional drive means 102 is advantageously an electric motor operating system and the bi-directional drive means control means 124 is an electrically operated remote control device providing electrical signals for directing the drive means 102. These components are well known and understood in the art so as not to require further detailed description or explanation at this point. The electric motor operating system and the bi-directional drive means control means may be in communication by a hard wire signal interconnection means as shown in FIG. 1, or by wireless signal interconnection means. A rotation limit control means 141 such as a limit switch, may be used for enabling automatic rotational halt of the roller 116 at, at least one rotational position. Such a control means may advantageously use a protruding flap or finger, or other feature for engaging the limit switch 141, thereby initiating a cease rotation command signal to the electric motor operating system 102 so as to position the roller 116 at a selected location automatically. This is envisioned in FIG. 6A where the proximal ends 154 of the sheets 202 constitute such control features by their proximity and may be caused to interact with the limit switch 141 to count the number of the sheets 202 which have moved to uncoil so as to stop the rearward going rotation and to start forward going rotation to extend sheet 202c automatically.

Alternately, the invention may be employed and used by positioning the roller 116 so that the proximal ends 154 of the sheets 202 are generally aligned and extended downwardly across a rear face 158 of the roller 116 as shown in FIG. 4a. In this case the selected one of the sheets 202c, and any of the sheets laying over it, sheets 202d-f in FIG. 4B, may be uncoiled by one of the series of overlapping wraps to a position exposing the selected one of the sheets 202c as shown in FIG. 4D, so that as the roller 116 is rotated to extend the sheets 202 downwardly, the inwardly facing surface 202B of the selected one of the sheets 202c is visible from the viewpoint opposing the front face 156 of the roller 116. Assuming that each of the sheets 202 has a useful backdrop surface on both of its sides, by reversing the roller 116 one is able to store and have ready for use, twice as many backdrop surfaces as there are sheets 202 on the roller 116.

The above described apparatus enables the instant inventive method of displaying the flexible background sheets 202. The method comprises the steps of:

a) providing a plurality of flexible background sheets 202, each of the sheets 202 having an outwardly facing surface 202F, and an opposing inwardly facing surface 202B, the surfaces of the sheets providing at least two different visual effects, and preferably a different visual effect for each of the surfaces 202F and 202B;

b) joining the sheets 202 at a distal end 152 of each of the sheets 202 to a horizontally disposed roller 116;

c) coiling the sheets 202 around the roller 116 to form a series of overlapping wraps so that proximal ends 154 of the sheets 202 are generally aligned and extended downwardly across a front face 156 of the roller 116;

d) uncoiling all of the sheets 202 lying over a selected one of the sheets 202c to a position exposing the selected one of the sheets 202c;

e) rotating the roller 116 to extend the sheets 202 downwardly so that the outwardly facing surface 202F of the selected one of the sheets 202c is visible from a viewpoint opposing the front face 156 of the roller 116.

Alternatively, the method of displaying flexible background sheets 202 may comprise the steps of:

a) providing a plurality of flexible background sheets 202, each of the sheets having an outwardly facing surface 202F, and an opposing inwardly facing surface 202B, the surfaces providing at least two different visual effects and preferably one effect for each surface;

b) joining the sheets 202 at a distal end 152 of each of the sheets 202 to a horizontally disposed roller 116;

c) coiling the sheets 202 around the roller 116 to form a series of overlapping wraps so that proximal ends 154 of the sheets 202 are generally aligned and extended downwardly across a rear face 158 of the roller 116;

d) uncoiling a selected one of the sheets 202c and all of the sheets 202 lying over the selected one of the sheets 202c to a position exposing the selected one of the sheets 202c;

rotating the roller 116 to extend the sheets 202 downwardly so that the inwardly facing surface 202B of the selected one of the sheets 202c is visible from a viewpoint opposing the front face 156 of the roller 116.

The instant invention may be described in further detail as to the preferred embodiment. Further details of the preferred embodiment are described below. The single roller background support system generally designated 100, FIG. 1, is primarily intended for use in a photographic studio or theater. This apparatus may be mounted directly on a wall, suspended from a ceiling, or suspended from a freestanding structure in any conventional fashion. As shown in FIG. 1, the preferred embodiment calls for its mounting on a ceiling. Background support system 100 contains roller 116 supported by two shafts, inboard shaft 110 and outboard shaft 112. These two shafts are pivotally supported by inboard shaft bearing 108 and outboard shaft bearing 114. The diameter of roller 116 will range nominally between 7.5 cm and 15 cm, and its length will be 25 cm to 30 cm longer than the maximum width of background sheets attached to it. For most photographic studio applications, this length ranges from 2.5 meters to 6 meters, although any suitable length may be selected. The physical characteristics of roller 116, its diameter, wall thickness, and the material of which it is constructed, will depend upon the combined weight of the background sheets it must support. In most applications, aluminum is an excellent choice for this roller.

Two options are available for providing bi-directional rotation and control of roller 116. The preferred embodiment utilizes an electric motor operating system 124. An alternate embodiment utilizes sprocket 118, attached to roller 116 in some appropriate manner, and controlled manually by roller chain 120.

The preferred embodiment, the electric system option, requires that inboard shaft 110 be of sufficient length to pass through inboard shaft bearing 108 and allow its attachment to one end of shaft coupler 106. The other end of shaft coupler 106 is attached to gearmotor output shaft 104.

Electrical input commands to gearmotor 102 consist of energizing or de-energizing the gearmotor, and providing bi-directional rotation to the gearmotor, thusly raising or lowering the background sheets 202 as commanded. This control system is virtually identical to that employed in the raising or lowering of an electrically controlled car window. With respect to the electrical control system under discussion, depicted in FIG. 8, switch 128 is mounted in command unit 126, which in turn, is connected electrically, via a three-conductor command unit cable 130, to motor control unit (MCU) 124. Pushing switch 128 in one direction energizes a relay in MCU 124, which directs gearmotor 102 to rotate in a given direction. Release of pressure on switch 128 allows it to return to its spring-loaded, "off" position, and the relay mentioned above is de-energized, thus causing gearmotor 102 to stop. Alternately, pushing switch 128 in an opposite direction energizes a second relay in MCU 124, directing gearmotor 102 to rotate in the opposite direction. In an alternate embodiment, command unit transmitter 132 contains an identically configured momentary-off-momentary switch 128 which keys a wireless transmitter in command unit transmitter 132 to initiate appropriate signals to command unit receiver 134. This alternately causes energizing of either of the two above-mentioned control relays in MCU 124. In this manner, actuation and bi-directional rotation control of gearmotor 102 is provided utilizing wireless transmission technologies.

As mentioned previously, an alternate embodiment involves mounting sprocket 118 on either inboard shaft 110 or outboard shaft 112. Hand-actuated roller chain 120 will be employed to drive sprocket 118 providing bidirectional rotation and control of roller 116. Some form of braking system will be required to render roller 116 non-rotational at various points in the selection and retrieval process. The options for satisfying this braking requirement are too numerous to mention. Brake drum configurations, disk pad configurations, ratchet/pawl configurations, etc., are equally practical. The choice of a braking system will be left to the person designing a specific system.

Attachment of background sheets 202 to roller 116 may be accomplished in several ways. In the preferred embodiment, the stack of background sheets is arranged on a flat, horizontal surface, preferably a floor. The important considerations are that the background sheets be arranged to have distal ends 152 and left edges as coincident as possible, and that the background sheet on the bottom of the stack be about 1 cm longer than the background sheet immediately placed above it. Similarly, each background sheet going from the bottom of the stack to the top of the stack is 1 cm shorter than the one immediately beneath it. When the entire stack is attached to roller 116 and deployed generally vertically, this spatial separation of proximal ends 154 of the background sheets allows for immediate visual identification of any specific background sheet in the stack. Some means of securing the assembled stack along its distal ends must be provided prior to its installation on roller 116. This can be accomplished by stapling, gluing, clamping, or providing temporary stitching to immobilize all of the background sheets 202 along their distal ends. Once the stack is a cohesive entity, roller 116 can be positioned on the floor adjacent to the stack, and the stack attached to it. Pre-drilled and appropriately dimensioned holes should be provided in roller 116 for securing the assembled background stack to the roller, using attachment screws 208. It is very important to align background stack 204 to roller 116 such that the left edge of the stack is as close as possible to a 90° degree angle to the axis of rotation of roller 116. This will minimize the tendency of the stack to creep laterally, that is to say, telescope, along roller 116 as it is wound upward. If held to a total run out of 2.5 cm to 3.5 cm, telescoping of the stack will not present any problems.

Background grommet 210 is provided midpoint at proximal end 154 of each background sheet 202 to allow for attachment of lanyard 136 to the background sheet selected for display. Referring to Detail A, FIG. 3A, each background sheet should be provided with background hem 142 along its proximal end to accommodate background weight 144. This weight will be sized to minimize wrinkling of the background sheet when it is deployed generally vertically.

FIG. 2 details lanyard 136 used to facilitate the selection and retrieval of a selected background sheet. The body of this lanyard is constructed from a length of generally flexible material. Cotton or nylon webbing 2 mm thick by 25 mm wide and approximately 1 meter in length. Attached to one end of this lanyard is lanyard hook 138; at its other end, lanyard weight 140.

Lanyard hook 138 is designed to engage grommet 210 of the selected background sheet, whereas lanyard weight 140 is designed to provide a continuous downward force upon the selected background sheet during the retrieval phase of the selection/retrieval procedure. As will be discussed subsequently, flap 137 is provided to trip limit switch 141 during one of the alternate embodiments of the selection and retrieval process.

When taking full length photographs, the photographer often arranges a background sheet such that it reaches the floor and then extends a few meters along the floor towards the camera. This provides for continuity between the foreground of the photograph and the vertical portion of the background sheet. With multiple background sheets mounted on a single roller, the background sheets not being used must be unrolled a length equivalent to that of the desired background sheet. Provisions must be made, therefore, to control an additional 2 to 3½ meters of length of each of the background sheets not being used. Referring to FIG. 7A, the preferred embodiment involves a trapeze-like structure over which the excess length of background sheets can be draped and stored. As shown in FIGS. 7B through 7D, this structure involves suspending storage rack 146 from a ceiling, or other overhead structure, using two vertical, rack-support straps 147 secured at either end of rack 146. Rack 146 should be 30 cm to 40 cm longer than the widest background sheet in the assembled stack. Straps 147 should be dimensioned to position rack 146 horizontally and approximately 2 meters above floor level. Additionally, spring clamps 148, FIG. 7A, are provided to secure the unused background sheets to rack 146 during the background storage phase.

The single roller background support system 100 may be further described as comprising a horizontally disposed, rotatable roller 116 upon which is wrapped a plurality of flexible, scenic or colored background sheets previously identified as background stack 204. These background sheets are joined to roller 116 at their distal ends 152, FIGS. 3A and 4A, and wrapped therearound so that their proximal ends 154, FIG. 3A, are generally aligned and extended downwardly across front face 156 of roller 116. Utilizing grommet 210, the proximal ends of the background sheets provide for engagement of lanyard hook 138, FIG. 2, to the background sheet selected for display.

As discussed earlier, bi-directional drive control of roller 116 will be provided by one of two systems—an electric motor operating system, or a totally manual, hand-actuated system. Either system must provide roller 116 with the following five operational control functions: roller rotation start up, roller rotation stop, roller forward rotation, roller reverse rotation, and roller lock up. The configuration and operational characteristics of both of these systems have been discussed previously at length, and need no restatement.

When it becomes necessary to extend a selected background sheet beyond its normal ceiling-to-floor length, measures must be taken to store the extended lengths of the background sheets not being used. The solution to this requirement is shown in FIG. 7. Horizontally disposed storage rack means 146 is positioned adjacent to, and in parallel with, rear face 158 of roller 116. Rack 146 provides support to the background sheets beneath and behind the selected background sheet, holding these background sheets in a draped position during extension of the selected background sheet 202c for viewing. Spring clamps 148 are used to secure the unused background sheets to rack 146 during the background storage phase.

Two options are available for winding background stack 204 on roller 116, using either forward rotation or reverse rotation of roller 116 initially. The preferred embodiment is an initial reverse rotation of roller 116 as depicted by direction of rotation 200, FIG. 3A. This results in the terminal position of background sheet 202a residing on the top of stack 204 when the stack is completely wound up. An alternate embodiment, depicted in FIG. 4A, results from an initial forward rotation of roller 116, wherein the terminal position of background sheet 202f will reside on the top of stack 204 when completely wound up. As will be discussed subsequently, the preferred embodiment of an initial reverse rotation of roller 116 allows for either a manual or a semi-automatic procedure for the selection and retrieval of a desired background sheet. The alternate embodiment, i.e., an initial forward rotation, precludes the use of flap 137 to initiate a cease rotation command to roller 116 since flap 137 ends up buried inside the assembled stack of background sheets and is unable to trip limit switch 141.

The selection process for the preferred embodiment begins with having the proximal ends of stack 204 positioned at approximately shoulder height of the operator. At this time, lanyard hook 138 is inserted in grommet 210 of background sheet 202c, the background sheet targeted for selection and display. This is depicted in FIG. 3B. Referring to FIG. 3C, reverse rotation of roller 116 will eventually cause background sheets 202a and 202b to progress beyond top dead center of roller 116, and fall behind it. Background sheets 202c through 202f are constrained from falling behind the stack because of the restraining force exerted downwardly on lanyard 136 by lanyard weight 140. As soon as background sheets 202a and 202b have fallen behind the stack, direction of rotation 200 of roller 116 will be reversed as depicted in FIG. 3D. Continued downward pressure upon lanyard 136 will cause background sheet 202c to emerge in front of the stack as the stack continues to unwind. FIG. 3D presents the fully deployed position of all background sheets 202a through 202f when the stack is completely unwound. Most importantly, background sheet 202c, the background sheet selected for display, is presented to the camera.

The alternate embodiment will use an initial forward rotation of roller 116, FIG. 4A. Again, assuming background sheet 202c is the one selected for display, lanyard hook 138 will be attached to background sheet 202b, repeat, background sheet 202b, as depicted in FIG. 4B. Please note, with the initial rotation forward, the background sheet in front of the selected background sheet will be the one to which hook 138 is attached. As roller 116 is rotated in a forward direction, background sheet 202f will fall freely toward the operator once it has passed beyond top dead center of roller 116, as evidenced in FIG. 4C. Background sheet 202f will be followed, in turn, by background sheets 202e, 202d, and 202c also depicted in FIG. 4C. Background sheets 202b and 202a will be constrained from falling because of the pressure exerted downwardly by weight 140. Reversal of direction of rotation 200, as shown in FIG. 4D, will cause stack 204 to unwind, and background sheets 202b and 202a will end up behind background sheets 202c through 202f as depicted in FIG. 4D. Again, selected background sheet 202c will be presented to camera.

Figure 8:
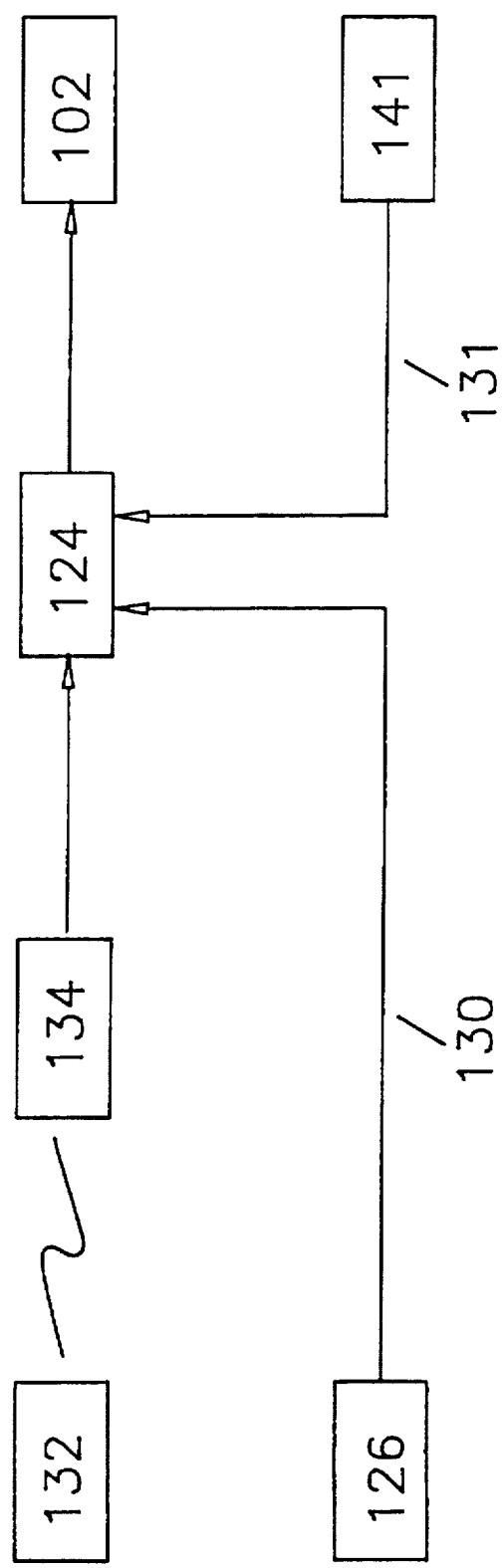
FIG. 8 is a block diagram of the various electrical control components of the invention.

FIG. 5 identifies Section B, as further detailed in FIG. 6A. Let it be again assumed that background sheet 202c is the background sheet to be chosen for viewing. With an initial selection of reverse rotation of roller 116, and with the proximal ends of the background stack positioned approximately at shoulder height of the operator, hook 138 will be affixed to background sheet 202c as shown in FIG. 6B. Roller 116 will then be directed to rotate in a reverse direction to wind the background stack upwardly to the position shown in Section B, FIG. 6A. Referring to FIG. 6C and FIG. 8, as reverse rotation of roller 116 continues, flap 137 will eventually engage and actuate limit switch 141, sending a cease rotation command to gearmotor 102 via limit switch cable 131 and MCU 124. Again referring to FIG. 6C, background sheets 202c through 202f will be constrained from falling by the force exerted on them by weight 140, while background sheets 202b and 202a will be free to fall behind the stack. Reversing direction of roller 116 at this point will bring background sheets 202c through 202f downwardly, terminating in the arrangement of all background sheets as shown in FIG. 6D. Again, selected background sheet 202c will be presented to camera viewing position 150.

The procedure for draping and storing the unused background sheets is depicted in FIGS. 7A through 7D. Following separation of the desired background sheet 202c from the remaining background sheets, depicted in FIG. 3C, and the reversal of rotation of roller 116, the bottom of the background stack is allowed to descend to the point where it is level with storage rack 146. Cease rotation of roller 116. Rack 146 is then pulled toward the camera by the operator and positioned such that the descending background sheets can be separated, as shown in FIG. 7B. Background sheet 202c is directed to fall on the camera side of rack 146, while the remaining background sheets are directed to a position behind the rack. Reestablish downward travel of all background sheets until the lowest background sheet is approximately ⅓ meter from floor level. Cease rotation of roller 116. Using spring clamps 148, secure background sheets 202a through 202f to rack 146, as shown in FIGS. 9A and 9C. At this point 1⅔ meters of background sheets will be draped over rack 146. Reestablishing downward movement of the background stack, the operator can then grasp the bottom of background sheet 202c and support it slightly above floor level, as it is unrolled toward the camera. Background sheets 202a through 202f will be looped downward as shown in FIG. 7A. Should the bight of this loop reach floor level, the combined length of unused background sheets will be the 2 meters located between floor level and rack 146, plus 1⅔ meters of background sheets draped over rack 146 for a total of 3⅔ meters. This will allow for a horizontal extension of background sheet 202c in excess of 3½ meters. In most instances a background sheet extension of 2 to 2½ meters will be more than adequate for most full-length portraits.

Following completion of the photo session, all background sheets will be wound upwardly on roller 116 in preparation for storage. When the bight of the draped background sheets is about to disappear, cease upward motion of the background stack and remove spring clamps 148. All backgrounds 202 may then be wound upward to their stored position. In the process, rack 146 will release and swing backward unattended. The dimensional separation between the point of attachment of rack support straps 147 and the point of attachment of roller 116 should be 30 cm nominally.

The selection and retrieval of a desired background sheet from it stored position in the background stack may be further described in the following manner. The preferred embodiment for the selection and retrieval procedure will elect an initial reverse rotation of roller 116, FIG. 3A. With the entire stack of background sheets deployed downwardly, engage hook 136 to the proximal end of the background sheet selected for viewing, FIG. 3B. Rotate roller 116 in a reverse direction until each of the proximal ends of each of the background sheets laying on top of the selected background sheet moves beyond the top of the roller/background stack combination, FIG. 3C, and moves to an unrolled position extending downwardly across the front face of roller 116 and laying under the background sheet selected for display. Lanyard weight 140, through the downward force it exerts upon lanyard 136, will prevent the selected background sheet and all background sheets laying beneath it from progressing beyond the top of the roller/assembled stack position. At this point, rotation of roller 116 in a forward direction is to be commanded by the operator, FIG. 3D, and all background sheets will unroll downwardly with the selected background sheet presented to the camera.

The alternate embodiment of the selection/retrieval procedure will elect an initial forward rotation of roller 116, FIG. 4A. With the entire stack of background sheets deployed downwardly, engage hook 136 to the proximal end of the background sheet laying immediately beneath the background sheet selected for display. Rotate roller 116 in a forward direction, FIG. 4B, until each of the proximal ends of each of the background sheets, on top of the selected background sheet, moves to an unrolled position extending downwardly across the rear face of roller 116. At this point, the selected background sheet will appear in view of the operator. Rotation of roller 116 in a reverse direction will be commanded, FIG. 4D, and all background sheets will unroll downwardly with the selected background sheet presented to the camera.

It will be noted in the discussions immediately preceding that the operator decides the point at which reversal of rotation of roller 116 is chosen. This decisional point can be automated by the use of flap 137 in combination with limit switch 141. As discussed previously, when flap 137 contacts switch 141, FIG. 6C, a cease rotation command to roller 116 is initiated. In order to accomplish separation of unwanted background sheets from the background sheet selected for display, a specific rotational orientation of roller 116 must be achieved. When this position is reached, initiation of the command to reverse direction of rotation will allow the selected background sheet to emerge in view. By establishing the correct angular relationship between flap 137 and roller 116, this cease rotational command will be attained accurately and automatically.

FIG. 8 is a block schematic of the various electrical components utilized to provide rotational control of roller 116. MCU 124 accepts either a signal from command unit 126 via command unit cable 130 or a wireless transmitted signal generated by command unit transmitter 132 via command unit receiver 134. MCU 124 also accepts an input from limit switch 141 via limit switch cable 131, commanding roller 116 to cease rotation. MCU 124 interprets these various signals and processes them into commands to activate, deactivate, or cause gearmotor 102 to rotate in an appropriate manner.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising:

a plurality of flexible background sheets, each of the sheets having an outwardly facing surface, and an opposing inwardly facing surface, the surfaces providing at least two different visual effects;

the sheets being joined at a distal end of each of the sheets to a horizontally disposed roller, and coiled therearound to form a series of overlapping wraps so that proximal ends of the sheets are generally aligned and extended downwardly across a front face of the roller;

all of the sheets lying over a selected one of the sheets, being capable of being uncoiled by one of the series of overlapping wraps to a position exposing the selected one of the sheets so that as the roller is rotated to extend the sheets downwardly, the outwardly facing surface of the selected one of the sheets is visible from a viewpoint opposing the front face of the roller.

2. The apparatus of claim 1 wherein the proximal ends of the sheets are spatially separated so that a portion of each of the sheets is visible from the viewpoint opposing the front face of the roller.

3. The apparatus of claim 1 wherein each of the proximal ends of the sheets provides an engagement means.

4. The apparatus of claim 3 further including a means for weighting, engagable with any one of the engagement means and preferably engaged with the engagement means of the selected one of the sheets for urging the proximal end thereof against the series of overlapping wraps for facilitating the unwrapping of the sheets lying thereover.

5. The apparatus of claim 1 further including bi-directional drive means engaged with the roller for controlled rotation thereof.

6. The apparatus of claim 4 further including bi-directional drive means control means having forward and reverse rotation selection means for rotating the roller in a direction for unwrapping said sheets and thereafter, for rotating the roller in a direction for extending the selected one of the sheets downwardly for viewing thereof.

7. The apparatus of claim 5 wherein the bi-directional drive means is an electric motor operating system and the bi-directional drive means control means is an electrically operated remote control device providing electrical signals for directing the drive means.

8. The apparatus of claim 7 wherein the electric motor operating system and the bi-directional drive means control means are in communication by a hard wire signal interconnection means.

9. The apparatus of claim 7 wherein the electric motor operating system and the bi-directional drive means control means are in communication by wireless signal interconnection means.

10. The apparatus of claim 7 further including a rotation limit control means for enabling automatic rotational halt of the roller at, at least one rotational position.

11. The apparatus of claim 9 wherein the rotation limit control means includes a protrusion on the selection and retrieval means, the flap engaging a limit switch, initiating a cease rotation command signal to the electric motor operating system.

12. The apparatus of claim 1 further including a background sheet storage means positioned adjacent to the roller for receiving the sheets positioned behind the selected one of the sheets with said sheets being draped over the storage means.

13. The apparatus of claim 12 wherein the storage means is a horizontally oriented trapeze mounted bar, and further including at least one spring clamp for attaching the sheets to the bar.

14. An apparatus comprising:

a plurality of flexible background sheets, each of the sheets having an outwardly facing surface, and an opposing inwardly facing surface, the surfaces providing at least two different visual effects;

the sheets being joined at a distal end of each of the sheets to a horizontally disposed roller, and coiled therearound to form a series of overlapping wraps so that proximal ends of the sheets are generally aligned and extended downwardly across a rear face of the roller;

the selected one of the sheets, and any of the sheets laying thereover, being capable of being uncoiled by one of the series of overlapping wraps to a position exposing the selected one of the sheets so that as the roller is rotated to extend the sheets downwardly, the inwardly facing surface of the selected one of the sheets is visible from a viewpoint opposing a front face of the roller.

15. A method of displaying flexible background sheets, the method comprising the steps of:

f) providing a plurality of flexible background sheets, each of the sheets having an outwardly facing surface, and an opposing inwardly facing surface, the surfaces providing at least two different visual effects;

g) joining the sheets at a distal end of each of the sheets to a horizontally disposed roller;

h) coiling the sheets around the roller to form a series of overlapping wraps so that proximal ends of the sheets are generally aligned and extended downwardly across a front face of the roller;

i) uncoiling all of the sheets lying over a selected one of the sheets to a position exposing the selected one of the sheets;

j) rotating the roller to extend the sheets downwardly so that the outwardly facing surface of the selected one of the sheets is visible from a viewpoint opposing the front face of the roller.

16. A method of displaying flexible background sheets, the method comprising the steps of:

e) providing a plurality of flexible background sheets, each of the sheets having an outwardly facing surface, and an opposing inwardly facing surface, the surfaces providing at least two different visual effects;

f) joining the sheets at a distal end of each of the sheets to a horizontally disposed roller;

g) coiling the sheets around the roller to form a series of overlapping wraps so that proximal ends of the sheets are generally aligned and extended downwardly across a rear face of the roller;

h) uncoiling a selected one of the sheets and all of the sheets lying over the selected one of the sheets to a position exposing the selected one of the sheets;

i) rotating the roller to extend the sheets downwardly so that the inwardly facing surface of the selected one of the sheets is visible from a viewpoint opposing the front face of the roller.

* * * * *

UNITED STATES PATENT AND TRADEMARK OFFICE
CERTIFICATE OF CORRECTION

PATENT NO : 5799213

DATED : August 25, 1998

INVENTOR(S) : Raymond K. Saar

It is certified that error appears in the above-identified patent and that said Letters Patent is hereby corrected as shown below:

Col. 3, delete lines 63-65

Col. 4, line 33
 replace "FIG. 4B is an end view..."
 with --FIG. 4B is a schematic of an end view...--

Col. 4, line 49
 replace "FIG. 6B is a schematic of a schematic of an end view..."
 with --FIG. 6b is a schematic of an end view...--

Col. 4, line 52
 replace "FIG. 6C is a schematic of a schematic of an end view..."
 with --FIG. 6C is a schematic of an end view...--

Col. 4, line 57
 replace "FIG. 6D is a schematic of a schematic of an end view..."
 with --FIG. 6D is a schematic of an end view...--

Col. 4, line 61
 replace "FIG. 7A is a schematic of a schematic of a perspective view"
 with --FIG. 7A is a schematic of a perspective view... --

Col. 5, line 15
 replace "sheets 202 having an outwardly facing surface 201..."
 with --sheets 202 having an outwardly facing surface 202F...--

Col. 5, line 16
 replace "opposing inwardly facing surface 203..."
 with --opposing inwardly facing surface 202B...--

UNITED STATES PATENT AND TRADEMARK OFFICE
CERTIFICATE OF CORRECTION

PATENT NO : 5799213

DATED : August 25, 1998

INVENTOR(S) : Raymond K. Saar

It is certified that error appears in the above-identified patent and that said Letters Patent is hereby corrected as shown below:

Col. 5, line 18
  replace "provide a different visual effect on each surface 201 and 203..."
  with --provide a different visual effect on each surface 202F and 202B...--

Col. 5, line 34
  replace "202a of the selected one..."
  with --202F of the selected one...--

Col. 6, line 15
  replace "tageously use a protruding flap or finger..."
  with --tageously use a protruding flat 137 or finger Col. 6, line 40
  replace "116 on is able to store and have..."
  with --116, end for end, on is able to store and have...--

Col. 6, line 57
  replace "of the sheets202 are generally..."
  with --of the sheets 202 are generally...--

Col. 9, line 2
  replace "material. Coton or nylor webbing 2 mm..."
  with --material, cotton or nylon webbing 2 mm...--

Col. 9, line 4
  replace "end of this lanyard is lanyard hook 138; at its...
  with--end of this lanyard is lanyard hook 138 at its...--

Col. 11, line 38
  replace "202a through 202f to rack 146, as shown in FIGS. 9A
  with--202a through 202f to rack 146, as shown in FIGS. 7A--

UNITED STATES PATENT AND TRADEMARK OFFICE
CERTIFICATE OF CORRECTION

PATENT NO : 5799213
DATED : August 25, 1998
INVENTOR(S) : Raymond K. Saar

It is certified that error appears in the above-identified patent and that said Letters Patent is hereby corrected as shown below:

Col. 11, line 39
replace "9C. At this point..."
with --7C. At this point...--

Signed and Sealed this

Thirtieth Day of November, 1999

Attest:

Q. TODD DICKINSON

Attesting Officer

Acting Commissioner of Patents and Trademarks